US006633254B1

United States Patent
Sutphin

(10) Patent No.: US 6,633,254 B1
(45) Date of Patent: Oct. 14, 2003

(54) SELF-MODULATING REMOTE MOVING TARGET DETECTOR

(75) Inventor: Eldon Sutphin, Merrimack, NH (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 0 days.

(21) Appl. No.: 10/219,864

(22) Filed: Aug. 15, 2002

(51) Int. Cl.[7] .............................................. G01S 13/50
(52) U.S. Cl. ........................... 342/28; 342/58; 342/114; 342/115; 340/541; 340/554
(58) Field of Search .............................. 342/27, 28, 57, 342/58, 104, 114, 115, 127; 340/541, 552, 554

(56) References Cited

U.S. PATENT DOCUMENTS

| | | | |
|---|---|---|---|
| RE25,100 E | 12/1961 | Chapin ......................... | 367/93 |
| 3,691,558 A | 9/1972 | Hoard et al. .................. | 342/28 |
| 3,832,709 A | * 8/1974 | Klein et al. .................. | 342/127 |
| 3,836,960 A | * 9/1974 | Gehman et al. ............... | 342/27 |
| 4,051,472 A | * 9/1977 | Albanese et al. .............. | 342/28 |
| 4,215,341 A | 7/1980 | Cole ........................... | 340/552 |
| 4,286,260 A | * 8/1981 | Gershberg et al. ........... | 340/554 |
| 4,527,151 A | * 7/1985 | Byrne ......................... | 340/554 |
| 4,598,293 A | * 7/1986 | Wong ......................... | 342/201 |
| 5,966,090 A | * 10/1999 | McEwan ..................... | 342/27 |

OTHER PUBLICATIONS

"Reliable motion detection of small targets in video with low signal–to–clutter ratios", Nichols, S.A.; Naylor, R.B.; Security Tech., 1995. Procs. Institute of Elec. and Electronics Eng'rs 29th Annual 1995 Inter'l Carnahan Conf. on , Oct. 18–20 Pp. 447–445.*

"Moving target detection by along–track interferometry", Pascazio, V.; Schirinzi, G.; Farina, A.; Geoscience and Remote Sensin Symposium, 2001, IGARSS '01. IEEE 2001 International, vol.: 7 , 2001 Page(s): 3024–3026 vol. 7.*

"Improving intrusion detection radar", Foley, E.; Harman, K.; Cheal, J.; IEEE Aerospace and Electronics Systems Magazine , vol.: 17 Issue: 8, Aug. 2002 Page(s): 22–27.*

"New microwave sensors for intrusion detection systems", Martinez, F.P.; Galeano, F.C.; Security Technology, 1999. Proceedings. IEEE 33rd Annual 1999 International Carnahan Conference on , 1999 Page(s): 49–53.*

* cited by examiner

Primary Examiner—John B. Sotomayor
(74) Attorney, Agent, or Firm—Barry L. Haley; Malin, Haley & DiMaggio, PA; Daniel J. Long

(57) ABSTRACT

A self-modulating, remote, moving target detector for intrusion alarms, vehicle detection, and remote speed and distance measurement that includes a remote continuous wave radar transceiver that is used to detect moving targets. The same frequency used for the radar transmission is modulated in a continuous manner in order to transmit radar data concerning a moving target to a remote location away from the radar transceiver. The transceiver oscillator is self-modulated by the reflected signal received from a moving target in the transceiver and retransmitted such that the primary radar signal becomes the information carrier concerning the moving target, which is received remotely, in order to activate an alarm or a display system showing the moving target. The system could be utilized with any frequency from audio to light, with RF and microwave of primary interest.

11 Claims, 1 Drawing Sheet

SELF-MODULATING REMOTE MOVING TARGET DETECTOR

BACKGROUND OF THE INVENTION

1. Field of Invention

This invention relates to a self-modulating, remote, moving target detector for use in intrusion alarms, vehicle detection, and remote speed and distance measurement, and that includes a continuous wave radar transceiver in which the same frequency used for the radar transmission is modulated in a continuous manner in order to transmit radar data concerning a moving target to a remote receiver located away from the radar transceiver. The primary radar signal becomes the information carrier concerning the moving target, which is received remotely in order to activate an alarm or a display system showing the moving target. The system and method can be utilized with any frequency from audio to light, with RF and microwave of primary interest.

2. Description of Related Art

Radar is a system consisting of synchronized radio transmitters and receivers that emit radio waves and process their reflections for display for detecting and locating objects. Using the Doppler effect, radar can be used to detect moving targets. Typically the radar sends out a pulse of energy, shuts off and listens for the return echo from the same transmitter in which there is a receiver also. Based upon the Doppler effect, it is know that if the source of oscillation or the observer of oscillation is in motion, there is an apparent shift in frequency that can be measured at the receiver.

The use of the Doppler effect to detect moving objects in a microwave system to safeguard property against burglary and vandalism has been shown in U.S. Pat. No. Re. 25,100 issued to Chapin, where a personal intrusion device using microwave energy is continuously radiated throughout an area to be secured. The energy returned by a moving intruder is detected to produce the indication of his presence. Reflections obtained from fixed objects do not give rise to a change in phase or an apparent change in frequency and therefore have no effect on the system. Thus this system is capable of discriminating between moving and stationary objects. U.S. Pat. No. 4,215,341 shows an intrusion or movement detector that includes an oscillator for generating a radio signal, an antenna for transmitting said radio signal into an area to be surveyed by said detector which does not use a traditional receiver. The device in the '341 patent uses the variable radiation resistance relative to the positional movement of objects in a variable loading on the generator, and a monitor for monitoring the variable loading for activating a signal or an alarm. U.S. Pat. No. 3,691,558 issued Sep. 12, 1972, shows a moving object microwave detection system that utilizes a plurality of transceivers that are all wired to a remote alarm system or monitoring station to detect human intruders. The system uses the Doppler effect in a conventional transceiver oscillator detector and amplifier system.

The present invention uses the Doppler effect for moving target detection, but is quite different in structure and operation than those shown in the prior art. The present invention provides a moving target detector for humans, animals, or vehicles, in which the primary radiating wave from the main transceiver is continuous (not pulse) and is itself modulated by the return detected frequency in the transceiver, which is continuously transmitted to a remote RF receiver at a remote location. It is desirous to have as little phase noise as possible in the primary oscillator used in the radar system. In the present invention, the oscillator is self-modulated by the frequency shift of the moving target, such that the radar signal that is being continuously radiated is the information carrier through the modulation caused by the moving target frequency exchange. A remote receiver continuously receives information concerning the moving target without itself transmitting.

BRIEF SUMMARY OF THE INVENTION

A system and method for detecting moving targets such as human beings, animals, or vehicles for surveillance purposes that includes a radar transceiver that broadcasts a continuous wave from a first location, the radar transceiver also receiving a reflected radar signal from a moving target of a different frequency or phase and a modulating device within the radar transceiver to modulate the continuous radar wave as a function of the Doppler shift that is caused by the moving target. A different remote modulated wave receiver receives the primary radar transmission wave of the transceiver that includes modulated information about the moving target. The remote receiver includes demodulation circuitry and audio or video (or both) alarm and display to indicate the presence of the moving target.

The primary radar transceiver includes a voltage controlled oscillator that creates an RF continuous wave, an amplifier for enhancing the RF output and a power divider. The output of the power divider includes a circulator connected to the transmitting and receiving antenna. The power divider also has an output to a mixer which is also connected to the output of the circulator. Thus the mixer receives the original RF signal from the power divider and the output of the circulator which includes the received radar reflected signal from a moving target.

A circulator couples signals reflected from a moving target received back from the antenna to the mixer but not to the power divider.

The mixer detects frequency and phase differences between the signal from the power divider and the output of the circulator which represents the reflected signal. The difference in the continuous oscillated signal and the received reflected signal (in phase or frequency) is then amplified and fed back to a high gain/low frequency amplifier and to the voltage controlled oscillator in which the received radar signal modulates itself with its own Doppler or phase detected signal. The continuous wave source of radio frequency energy emitted by the voltage control oscillator has thus become modulated by the detected frequency and phase differences in the signal reflected from a moving target such that the transmitted continuous wave contains information concerning the moving target itself.

The system thus includes a remote receiver that receives the transmitted radio frequency energy containing information processed on the moving target. Thus the remote receiver includes an antenna, an RF receiver which includes an analog or digital signal processor that extracts the Doppler information which goes to an audio or visual alarm or display system. The remote receiver site then receives passively continuous information concerning moving targets in the area without the use of a second transmitter.

The system and method can be used basically for any frequency from audio to light with RF and microwave being perhaps the most useful. Using the method of the present invention modulation is introduced in the radar signal oscillator that normally would be kept clean in order to transmit a single frequency. The end result of the present invention is that a continuous flow of analog information audio and/or visual is available at the remote receiver concerning a moving target without a transmitter.

The invention has use for remote intrusion alarms, vehicle detection and remote speed and distance measurement.

ONE OR MORE OBJECTS OF THE INVENTION

It is an object of the invention to provide a method and apparatus to detect moving targets such as personnel using a continuous wave radar transceiver and a remote receiver.

It is another object of this invention to provide a continuous wave radar system that modulates the radar signal oscillator with moving target information for detecting moving targets that eliminates the need for two transmitters for remotely detecting a moving target using Doppler principles.

Yet another object of the invention is to provide an improved system for detecting a moving target at a smaller size, lower cost, with less power consumption and increased reliability.

And yet still another object of the invention is to provide a remote target moving detector for use as a remote intrusion alarm, vehicle detection and remote speed and distance measurement device that can use any frequency from audio to light.

PREFERRED EMBODIMENT OF THE INVENTION

Figure 1:
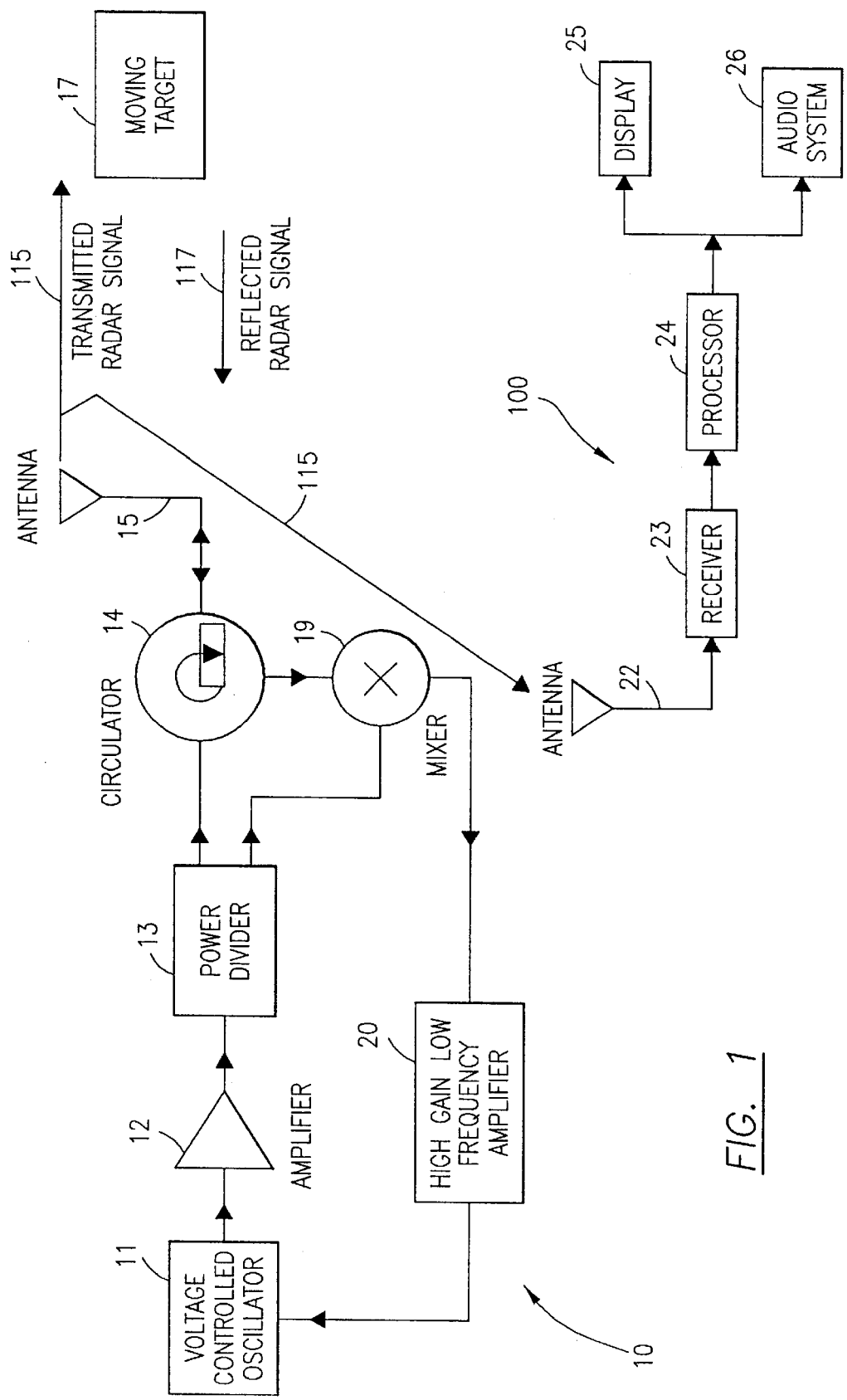
FIG. 1 shows a schematic diagram of the present invention.

Referring now to the drawings and in particular FIG. 1, the present invention is shown as a moving target detector that includes self-modulation with the reflected moving target signal.

The first major component of the system is a transceiver 10 that includes a voltage controlled oscillator 11 that produces a continuous source of radio frequency energy at a pre-determined frequency. The output of the voltage controlled oscillator is an amplifier 12 that increases the power level to a desired level for transmission purposes. The RF signal amplifier output from 12 goes to a power divider 13. The purpose of the power divider is to take the continuous RF signal and couple some of the energy as an output to a circulator 14 and some of the energy as an output to mixer 19. The circulator 14 is connected to transmit and receive antenna 15. The antenna 15 is selected as an appropriate size and type antenna for the particular frequency selected for system operation for the transmission of a radar signal and the receipt of a reflected radar signal. Note that the circulator 14 is coupled to the antenna 15 so that it is a directional device to send the frequency received from the voltage controlled oscillator to the antenna for transmission as a continuous wave radar signal. The circulator also receives the target reflected radar signals from antenna 15. The received reflected radar signals from antenna 15 cannot be sent to the power divider 13 but are sent to the mixer 19.

Mixer 19 receives two signals, one from the power divider which represents the signal from the voltage control oscillator and a second signal that represents the reflected radar signals, including reflected signals, from striking a moving target 17 which are reflected and received back at the antenna 15. The mixer 19 is capable of detecting the frequency difference and phase difference between the signals received in power divider 13 from the voltage control oscillator 11 and the output of circulator 14 which represent the reflected radar signals from targets, including moving target 17. The differences in these frequencies and phases, which may be small, are sent as an output from mixer 19 to a high gain/low frequency amplifier 20 to amplify the signal that is used to frequency modulate voltage control oscillator 11. The primary aspect of the present invention is the fact that the primary radar signal 115 being transmitted modulates itself with its own Doppler or phase detected signal 117 that comes back from the moving target 17. The significance is that the radar signal transmitted from antenna 15 is continuously modulated to include information concerning moving target 17 based upon the reflected radar signal. Provided the rate of change of the voltage control oscillator frequency is slow compared to the delay time between the transmitted radar signal and the received radar reflected signal, the modulated signal being transmitted continuously from antenna 15 is representative of the Doppler shift between the transmitted and received signals in the transceiver and the moving target.

Since the radar signal transmitted from antenna 15 is self-modulating and includes information concerning the target 17, the transmitted signal can be remotely received by an independent, separate, remote target detector 100 having one or more different receivers at a remote location such as receiver 23 that includes antenna 22. Thus, the transmitted radar signal 115 from antenna 15 (not the reflected signal) that includes information concerning the moving target is now received at antenna 12 at a remote location and processed in a RF processor 24. The moving target information can then be broadcast or displayed through audio system 26 or visually through display 25 at the remote location.

Because of the present invention, the system requires only one transmitter, not two transmitters. This greatly reduces the system's cost and complexity by eliminating a transmitter. The system is also continuously providing information to one or more passive remote receivers. The remote receiver does not need to be concerned with both the transmission and receipt of a reflected signal. It receives a direct transmission that includes information concerning the moving target directly from the primary transmitted RF signal. Thus a continuous flow of analog information is available to a remote receiver.

In utilizing the present invention, the method in the invention includes providing a continuous source of RF energy from a voltage controlled oscillator that is amplified and sent to the power divider. The RF signal is then divided between and sent to a circulator and to a separate mixer. The circulator is connected to an antenna that transmits a radar signal and receives reflected radar signals include signals that are indicative of a moving target. The received reflected target signals are processed in the mixer which recognizes the frequency (or pulse) shift caused by a moving target. The system modulates itself with the moving target detected signal. The transmitted radar signal that contains modulation information about the moving target is continuously transmitted to a remote RF receiver. The primary radar signal is processed and displayed or broadcast as an alarm through an audio system.

Although in the preferred embodiment a system using radar frequency RF energy is shown, microwave energy and in fact any frequency from audio to light could be used in the basic system. The primary application is intentionally introducing modulation into the radar signal oscillator to provide a continuous flow of analog information available to a remote receiver, without a second transmitter.

A digital modulator could also be used in a time-sharing mode such that if a moving target return is detected the voltage control oscillator would be momentarily oscillated with digital data conveying the event to the remote receiver.

The system would primarily be used with remote intrusion alarms or for detecting moving personnel in an area that needs surveillance. Thus, it can be used for detecting the movement of people or other objects such as vehicles or animals. The system can be used for vehicle detection and remote speed and distance measurement.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall there between. Now that the invention has been described,

What is claimed is:

1. A moving target detector for providing a remote intrusion alarm comprising:
   a radio frequency transceiver for transmitting a continuous wave for use as a transmitted radar signal and a receiver for receiving a reflecting radar signal;
   a remote radio frequency receiver remotely located from said transceiver for receiving a modulated transmitted radar signal;
   said transceiver including a RF voltage controlled oscillator generating a continuous wave at a pre-determined radio frequency;
   an antenna electrically coupled to said voltage controlled oscillator for transmitting a continuous radar signal and for receiving reflected radar signals, including signals reflected from a moving target;
   a power divider connected to the output of said voltage controlled oscillator;
   RF circulator connected to the output of said power divider for receiving said continuous RF wave from said voltage controlled oscillator, said circulator being electrically coupled to said antenna for transmitting said RF continuous wave and for receiving a reflected radar signal;
   an RF signal mixer having an input connected to the output of said power divider that receives the radio frequency wave from said voltage controlled oscillator and having an input connected to the output of said circulator for receiving said reflected radar signal from said circulator, said mixer detecting the frequency and phase differences between the transmitted radar signal and reflected radar signals from a moving target, the output of said mixer being connected as an input to the voltage control oscillator for modulating the signal generated by the voltage control oscillator;
   said transceiver providing for modulation of the generated RF radar signal for transmission representative of the Doppler shift between the transmitted radar signal and the reflected radar signal received;
   transmitting the radar signal to said remote receiver for processing the modulated information that represents information concerning a moving target; and
   an alarm connected to said remote receiver that is activated by moving targets signal information received.

2. A moving target detector as in claim 1, including:
   an RF signal amplifier connected to the output of said voltage control oscillator and having an input to said power divider.

3. A moving target detector as in claim 2, including:
   a high gain/low frequency amplifier connected to the output of said mixer having an input to said voltage control oscillator.

4. A moving target detector as in claim 1, including:
   said remote receiver including a signal processor for de-modulating said transmitted radar signal to recover information concerning said moving target; and
   said alarm including a display unit connected to the outset of said RF signal processor and an audio system connected to the output of said RF signal processor for displaying and an audio alarm to indicate the presence of a moving target.

5. A moving target detector as in claim 1, wherein the signal generated by the voltage control oscillator is frequency modulated by the input from the mixer.

6. The method of detecting a moving target using a continuous wave RF signal, a transceiver and a remote located RF receiver comprising the steps of:
   a) generating a continuous radio frequency signal from a voltage control oscillator;
   b) transmitting the RF signal generated by said voltage control oscillator as a transmitted radar signal;
   c) receiving a reflected radar signal from a moving target;
   d) self-modulating said oscillator generated frequency;
   e) transmitting the modulated radar signal including moving target information;
   f) receiving said transmitted modulator radar signal at a remote receiver.

7. A method of detecting a moving target as in claim 6, including the step of:
   g) providing an audio signal indicative of the information received from the RF processor in the remote receiver indicative of information concerning the moving target.

8. A method of detecting a moving target as in claim 6, including:
   h) amplifying the continuous radio frequency signal from the oscillator;
   i) dividing the amplified signal from the continuous radio frequency oscillator and sending a portion of the signal to a circulator and the other portion of the signal to a mixer;
   j) connecting the circulator to an antenna and to the mixer;
   k) receiving reflected target information signal from said antenna through said circulator and mixing said signal with the primary radar frequency to modulate the signal to include target information; and
   l) sending the mixed target contained information signal back to the oscillator for self-modulation of the main radar frequency.

9. A moving target detector for providing a remote intrusion alarm, comprising:
   a self-modulating radar transceiver for transmitting a primary radar signal and receiving reflected target signals;
   means for receiving reflected moving target signals in said transceiver and mixing said signals with the primary radar transmitted signal;
   means for modulating the primary radar signal with information regarding said moving target reflected received signal for transmitting said modulated signal;

means for receiving said modulated radar signal containing moving target information at a remote receiver; and means for providing an alarm indicative of moving target information received at said remote receiver.

10. A radar system for detecting moving targets comprising:

a continuous wave transmitter of a predetermined frequency for transmitting a radar signal;

a receiver connected to said transmitter for receiving reflected radar signals, including those from a moving target at a different frequency;

means for mixing said primary radar frequency and said received radar reflected signal having a different frequency;

means for mixing said first radar frequency and said target indicative received frequency;

means for modulating the radar frequency with the mixed signal frequency received that includes moving target information to modulate the primary radar transmitted frequency; and moving target detector for receiving continuous radar modulated signals indicative of moving target information.

11. A radar system as in claim 10, wherein said means for modulating the radar frequency with the mixed signal received frequency that includes moving target information is frequency modulated.

* * * * *